No. 841,306. PATENTED JAN. 15, 1907.
R. BENDER & F. W. TAYLOR.
COMBINED HOTHOUSE, GRAPERY, AND GREENHOUSE.
APPLICATION FILED NOV. 25, 1905.
2 SHEETS—SHEET 1.
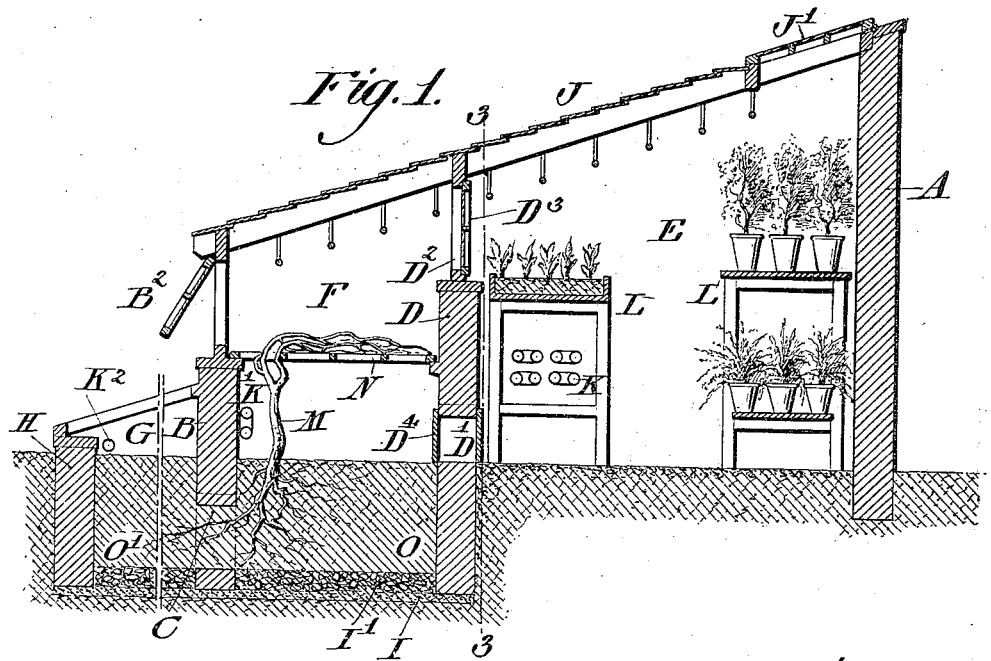
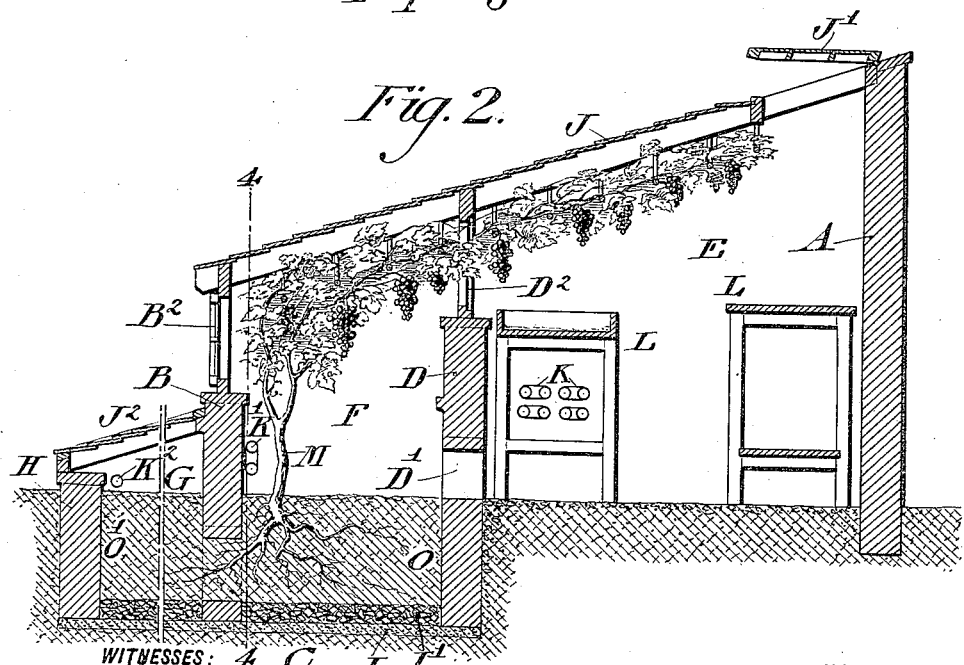
WITNESSES:
INVENTORS
ATTORNEY.

No. 841,306. PATENTED JAN. 15, 1907.
R. BENDER & F. W. TAYLOR.
COMBINED HOTHOUSE, GRAPERY, AND GREENHOUSE.
APPLICATION FILED NOV. 25, 1905.

2 SHEETS—SHEET 2.

WITNESSES:

INVENTORS
Robert Bender
Frederick W. Taylor
by Francis T. Chambers
their ATTORNEY.

UNITED STATES PATENT OFFICE.

ROBERT BENDER AND FREDERICK W. TAYLOR, OF PHILADELPHIA, PENNSYLVANIA; SAID BENDER ASSIGNOR TO SAID TAYLOR.

COMBINED HOTHOUSE, GRAPERY, AND GREENHOUSE.

No. 841,306. Specification of Letters Patent. Patented Jan. 15, 1907.

Application filed November 25, 1905. Serial No. 289,016.

*To all whom it may concern:*

Be it known that we, ROBERT BENDER and FREDERICK W. TAYLOR, citizens of the United States of America, and residents of the city and county of Philadelphia, in the State of Pennsylvania, have invented a certain new and useful Improvement in a Combined Hothouse, Grapery, and Greenhouse, of which the following is a true and exact description, reference being had to the accompanying drawings, which form a part thereof.

Our invention relates to the construction of hothouses, our object being to provide a hothouse of such a character that it can be conveniently used for growing both flowers and grapes.

Broadly speaking, our invention consists in constructing a hothouse in two compartments separated by a removable partition, the main compartment being provided with the necessary heating apparatus to enable it to serve as a hothouse for growing flowers and the other compartment being that in which the grape-vines grow and in which they can be housed during their period of rest and maintained during this period at the necessarily comparatively low temperature.

Other features of our structure will be best understood as described in connection with the drawings, in which—

Figure 3:
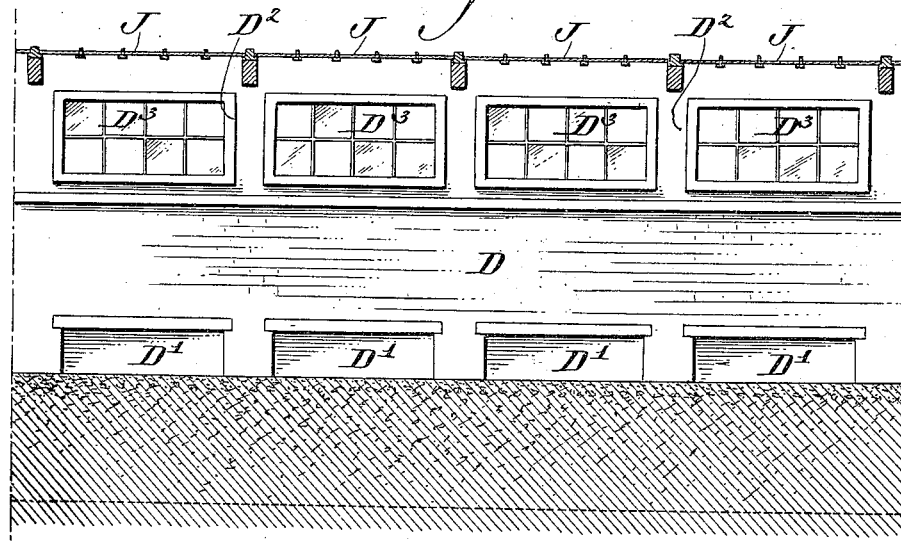
Figure 4:
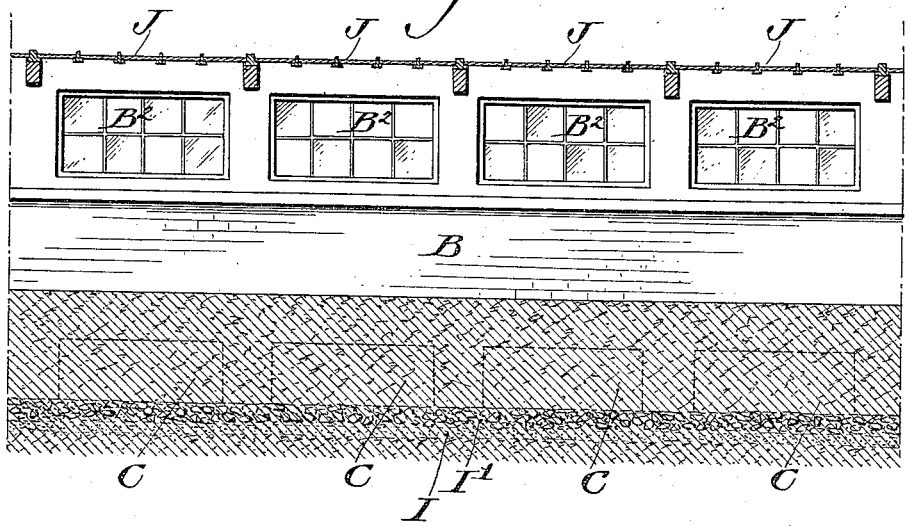

Figure 1 is a sectional side elevation of the combined greenhouse and grapery arranged as it is for the housing of the grapes during the period of rest and the simultaneous growing of flowers. Fig. 2 is a similar sectional view showing the condition and arrangement of the house during the growth and fruitage of the grape-vines. Fig. 3 is a sectional view on the line 3 3 of Fig. 1, showing the construction of the intermediate partition which we prefer to use; and Fig. 4 is a sectional view on the line 4 4 of Fig. 2, showing the preferred construction of the front wall of the house.

A is the back wall of the house.

B is the front wall of the house, the upper part consisting, preferably, of hinged sashes, as shown at $B^2$, and the lower part of the wall extending down into a root-growing space, which it divides into inner and outer compartments O O', openings C being formed in the bottom of the wall to connect these compartments below the surface of the ground.

D is the intermediate or partition wall which we prefer to use, said wall being preferably of masonry formed with closable openings D' at the floor-level and with a space $D^2$ intervening between the top of the wall and the roof of the house, which space is closed at proper times by removable sashes $D^3$.

$D^4$ indicates the removable covers for the openings D'.

J is the glass roof of the house, the upper portion J' of which is usually made of hinged sashes, as indicated, and the house proper is divided by the partition-wall into two chambers E and F. By preference the space G, lying in front of the front wall and over the root-compartment O', is provided with removable sashes, as indicated at $J^2$.

H is a wall extending down into the earth and forming the front wall for the compartment O'. The bottom of this wall and of the intermediate compartment-wall D, which forms also the rear wall for the root-compartment O, are preferably connected together by a cement flooring I, on top of which and below the root ground is preferably formed a drain of broken stone, such as indicated at I'.

K indicates the heating-pipes for the compartment E, K' heating-pipes for the compartment F, which, it will be understood, are entirely separate from the heating-pipes of the chamber E, and we have also indicated at $K^2$ a heating-pipe in the compartment G, which we prefer to provide for occasional use.

L L' are the benches for flowers in the compartment E.

M indicates the grape-vine, and N a rack on which the grape-vines can be laid during their period of rest. During the period of rest of the grape-vines they are taken down from their supports below the roof of the hothouse and housed in the compartment F, which compartment is entirely closed by the removable partition, the sashes $D^3$ and the covers $D^4$ being placed in position so that the compartment E can be heated to proper temperatures and used for growing flowers, while the compartment F is unheated or maintained at a temperature which will not interfere with the necessary rest of the grape-vines.

When it is desired that the grape-vines should be subjected to conditions which will cause them to grow, the removable partition (or sashes) D³ is removed and the vines secured to their supports below the glass roof of the house, as indicated in Fig. 2. The openings D' of the partition-wall have their covers D⁴ removed, so that the two compartments are practically thrown into one, with good circulation of air and heat. Where early grapes are desired, it may also be necessary to house the outer root-compartment O', which can be done by means of the sashes J² and, if necessary, by admitting a certain amount of heat to the space or chamber G through a heating-pipe K².

Having now described our invention, what we claim as new, and desire to secure by Letters Patent, is—

1. A house for growing grapes and flowers having in combination a compartment provided with heating apparatus and adapted for growing flowers a second compartment for housing the grape-vines while they are resting, a removable partition between the compartments, the removal of which enables the grape-vines to be extended into the first compartment during their period of growth, said second compartment having an opening communicating with the external atmosphere and means for closing said opening when desired.

2. A house for growing grapes and flowers having in combination a compartment provided with heating apparatus and adapted for growing flowers, a second compartment for housing the grape-vines while they are resting, a wall separating the lower parts of the two compartments and having closable openings connecting the bottoms thereof and removable sashes for closing the space between said wall and the roof of the house.

3. A house for growing grapes and flowers having in combination a root-growing compartment O, O', lying partly in front of and partly within the front wall of the house, a front wall formed with openings C, in the root-growing compartment, and a removable partition separating the house into flower-growing and grape-housing compartments.

4. A house for growing grapes and flowers having in combination a root-growing compartment O, O', lying partly in front of and partly within the front wall of the house, a front wall formed with openings C, in the root-growing compartment, removable sashes for covering in the outer root-growing compartment, and a removable partition separating the house into flower-growing and grape-housing compartments.

ROBERT BENDER.
FREDERICK W. TAYLOR.

Witnesses:
ARNOLD KATZ,
D. STEWART.